(12) United States Patent
Van Der Sluis (10) Patent No.: US 10,976,235 B2
(45) Date of Patent: Apr. 13, 2021

(54) OPTICAL PARTICLE SENSOR AND SENSING METHOD

(71) Applicant: KONINKLIJKE PHILIPS N.V., Eindhoven (NL)

(72) Inventor: Paul Van Der Sluis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/496,481

(22) PCT Filed: Mar. 26, 2018

(86) PCT No.: PCT/EP2018/057582
§ 371 (c)(1),
(2) Date: Sep. 23, 2019

(87) PCT Pub. No.: WO2018/177972
PCT Pub. Date: Oct. 4, 2018

(65) Prior Publication Data
US 2020/0033250 A1 Jan. 30, 2020

(30) Foreign Application Priority Data
Mar. 27, 2017 (EP) ..................... 17162986

(51) Int. Cl.
*G01N 15/14* (2006.01)
*G01N 15/02* (2006.01)

(52) U.S. Cl.
CPC ..... *G01N 15/1425* (2013.01); *G01N 15/1434* (2013.01); *G01N 15/1459* (2013.01); *G01N 2015/0238* (2013.01)

(58) Field of Classification Search
CPC .......... G01N 15/1425; G01N 15/1459; G01N 15/1434; G01N 15/1429; G01N 2015/0238; G01N 2001/2223
See application file for complete search history.

(56) References Cited

U.S. PATENT DOCUMENTS

| 5,430,301 | A | * | 7/1995 | Shofner | ............... | D01G 31/003 |
| | | | | | | 250/461.1 |
| 2002/0016068 | A1 | * | 2/2002 | Nakano | ................. | C23C 14/564 |
| | | | | | | 438/689 |
| 2003/0146394 | A1 | * | 8/2003 | Prange | ............... | G01N 21/6486 |
| | | | | | | 250/458.1 |
| 2004/0057050 | A1 | | 3/2004 | Beck | | |
| 2008/0002180 | A1 | | 1/2008 | Gigioli | | |

(Continued)

OTHER PUBLICATIONS

International Search Report and Written Opinion dated May 31, 2018 for International Application Nyumber PCT/EP2018/057582 Filed Mar. 26, 2018.

(Continued)

*Primary Examiner* — Sang H Nguyen (57) ABSTRACT

The invention provides an optical particle sensor which uses light sources of different first and second wavelengths. A first light source is used to detect light scattering and also to determine when a particle reaches a target positional area. In response to the particle being determined to reach the target positional area, a second light source is operated to provide a pulse of light, and light emitted from the particle in response to the pulse of light is detected by the same detector.

18 Claims, 5 Drawing Sheets

(56) References Cited

U.S. PATENT DOCUMENTS

| | | | |
|---|---|---|---|
| 2008/0297360 A1* | 12/2008 | Knox | G08B 29/185 |
| | | | 340/628 |
| 2009/0122311 A1 | 5/2009 | Kanda | |
| 2013/0037726 A1* | 2/2013 | Kiesel | G01N 15/1459 |
| | | | 250/458.1 |
| 2014/0087971 A1* | 3/2014 | Kiesel | B01J 19/0046 |
| | | | 506/12 |
| 2015/0090014 A1* | 4/2015 | Goto | G01N 30/74 |
| | | | 73/61.58 |
| 2016/0077001 A1 | 3/2016 | Knox | |
| 2016/0209318 A1 | 7/2016 | Javadi | |
| 2018/0217067 A1* | 8/2018 | Gallager | G01J 3/10 |

OTHER PUBLICATIONS

Victoria V. Roshchina, "Vital Autofluorescence: Application to the Study of Plant Living Cells", International Journal of Spectroscopy, vol. 2012 (2012), Article ID 124672.

Shinyei Technology, https://www.shinyei.co.jp/stc/eng/optical/index.html.

Mitsumoto, et al: "Classification of pollen species using autofluorescence image analysis", Journal of Bioscience and Bioengineering, vol. 107 No. 1, 90-94, 2009.

\* cited by examiner

OPTICAL PARTICLE SENSOR AND SENSING METHOD

CROSS REFERENCE TO RELATED APPLICATIONS

This application is the U.S. National Phase application under 35 U.S.C. § 371 of International Application No. PCT/EP2018/057582 filed Mar. 26, 2018, published as WO 2018/177972 on Oct. 4, 2018, which claims the benefit of European Patent Application Number 17162986.8 filed Mar. 27, 2017. These applications are hereby incorporated by reference herein.

FIELD OF THE INVENTION

This invention relates to optical particle sensors and sensing methods.

BACKGROUND OF THE INVENTION

Particle sensors are for example used to measure the level of pollution in the air.

Low-cost systems are available based on the measurement of light scattered at the particles which pass along with an air flow through a detection volume in the sensor. This air flow is for example driven by a fan or a heater. Each particle is illuminated by a continuous light source and creates a light pulse with a duration determined by the passage time of the particle through the detection volume.

These pulses are amplified, filtered and counted in an electronics system. In addition to indicating the particle concentration level, such detectors can be used to drive the operation of an air purifier device.

Particulate air pollution has been associated with increased morbidity and mortality from respiratory and cardiac disease and with allergic reactions. The precise effects on human health depend on the type of particle present.

Thus, there is a need to identify which types of particle are present in addition to providing a concentration level.

Fine particles, larger than about 0.5 µm can be counted individually by optical means using existing technology as outlined above. In most cases, a cheap and efficient LED or laser with a red or near infrared wavelength is used. Pollen detectors are commercially available which operate in this way.

A pollen detector can generally detect one type of pollen and discriminate from the presence of dust, but it cannot distinguish between more pollen types or fungal spores.

In order to identify which type of particle is present (dust or which type of pollen or fungal spore), the particle may be illuminated with multiple light sources, such as visible (400 nm to 760 nm), infrared (760 nm to 3000 nm) and UV wavelengths (200 nm to 400 nm). The UV illumination can give rise to fluorescence whereas the visible and IR illumination give rise to scattering. The ratio between these different effects can be used to identify the type of particle. This is for example disclosed in the article "Classification of pollen species using autofluorescence image analysis", J Biosci Bioeng. 2009 January; 107(1):90-4, or Vital Autofluorescence: "Application to the Study of Plant Living Cells", International Journal of Spectroscopy, Volume 2012 (2012), Article ID 124672.

These methods currently require expensive professional equipment.

Figure 1:
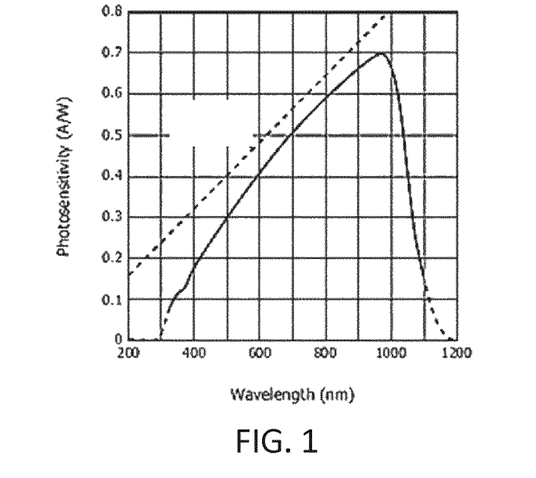
FIG. 1 shows the photosensitivity of a low-cost detector as a function of wavelength.

One of the problems to be overcome is the narrow wavelength sensitivity of the optical detectors. That makes it difficult to use detectors for other wavelengths. For instance, the cheap mass-produced photodetector designed for remote controls has a maximum efficiency at around 970 nm. FIG. 1 shows the photosensitivity as function of wavelength for this type of photodetector. If this detector is used to detect scattering of particles at the UVA wavelength of around 365 nm, or fluorescence at around 340 nm, the detector sensitivity is reduced to below 0.1.

There is therefore a need for an optical particle sensor which is able to perform measurements at multiple wavelengths (and hence enable particle identification as well as size measurement), but which can be made using low-cost mass-produced electrical components.

US 2004/0057050 discloses a system for detecting particle size based on light scattering and for detecting fluorescence. A first and second light source are used and a common sensor. US 2016/0209318 discloses a cytometry system with a plurality of lasers along a flow stream path. A detector is used to detect side scattered or fluorescent light.

SUMMARY OF THE INVENTION

The invention is defined by the claims.

According to examples in accordance with an aspect of the invention, there is provided an optical particle sensor, comprising:

an optical arrangement comprising at least first and second light sources of different first and second wavelengths;

an optical detector for detecting light emitted from particles to be sensed or light from the light sources scattered by particles to be sensed; and a controller for controlling the operation of the first and second light sources, wherein the controller is adapted to:

operate the first light source, and detect light scattering using the optical detector;

determine when a particle reaches a target positional area based analyzing the detected scattered light;

in response the particle being determined to reach the target positional area, operate the second light source with a drive signal which is at least 2 times the maximum permitted continuous drive signal to provide a pulse of light with a duty cycle of less than 20%; and detect light emitted from the particle in response to the pulse of light using the same optical detector.

This arrangement uses a first light detector signal to provide scattering information but also to provide accurate particle position identification. This then enables a second light source to be used only for a short pulse, because it can be turned on only when the particle is within the field of view of the light pulse. This short light pulse enables an improved signal to noise ratio, because the light source current can be increased for short durations, for example by a factor of up to 10 or more compared to a steady state current limit. Due to thermal constraints this pulse may only be present for 10% of the time, giving a maximum duty cycle of 10% for this example. More generally, the controller is adapted to operate the second light source with a duty cycle of less than 20%.

The second light source is driven with a drive signal which is at least 2 times the maximum permitted continuous drive signal, for example in the range 5 to 100 times.

The optical detector may comprise multiple individual detector elements. However, the optical detector is fully shared between the detection at the first and second wavelengths. Thus, the detector has the same wavelength-sensitivity function when detecting the both wavelengths.

The first light source preferably has an output wavelength at the maximum sensitivity of the detector. More generally, the output wavelength within the wavelength of maximum sensitivity +/−10%, or even more preferably +/−5%.

The first light source is used to detect the presence of the particle as well as to obtain a scattering profile. Because the detector arrangement is then very sensitive at that wavelength the first light source can be driven at low power and therefore on most of the time or even permanently.

The optical detector preferably comprises a single optical sensor for detecting the first and second wavelengths, wherein the optical sensor has greater sensitivity to the first wavelength than to the second wavelength, such as a a maximum sensitivity at or adjacent the first wavelength.

The sensor may further comprise a background level compensation circuit for reducing the response time for the optical detector to adapt to changes in background scattering when operating the second light source. When introducing a light pulse from the second light source, the operating point of the optical detector will change, in particular a different background level will be present. The optical detector for example has a control loop for cancelling this background level, but this control loop takes time to stabilize. The background level compensation circuit avoids the need for the optical detector to re-stabilize.

For example, the optical detector may comprise the optical sensor and an amplifier for amplifying the optical sensor signal, and the compensation circuit is for injecting a signal to the amplifier which emulates a background signal, such as to reduce the change in background signal seen by the amplifier. Thus, the amplifier sees a constant background level which means the control loop does not need to make adjustments.

The first light source for example comprises an infrared, for example near infrared, LED. The second light source for example comprises a UV LED. It may however be a pulsed UV laser.

The controller may be adapted to turn off the first light source when operating the second light source. By switching off the first light source during the time the second light source pulsed is present, a single photodetector may be used for recording of both wavelengths. Thus, the optical detector arrangement may comprise a single optical detector for detecting the first and second wavelengths, wherein the optical detector has greater sensitivity to the first wavelength than to the second wavelength.

The controller may be adapted to determine that a particle has reached the target positional area when the detected scattered light level passes a peak intensity.

The optical arrangement may further comprise a visible light source. In this case, three different wavelengths may be used to characterize the particles.

The controller may further be adapted to provide an identification of a type of particle based on analysis of the detected scattered light and the detected emitted light.

The invention also provides an optical particle sensing method, comprising:

operating a first light source having a first wavelength output;

detecting light scattered from a particle;

analyzing the detected scattered light to determine when the particle reaches a target positional area;

in response the particle being determined to reach the target positional area, operating a second light source having a second, different, wavelength to provide a pulse of light, wherein the second light source is operated with a duty cycle of less than 20% and with a drive signal which is at least 2 times the maximum permitted continuous drive signal; and detecting light emitted from the particle in response to the pulse of light.

The first wavelength may be infrared, in particular near infrared, and the second wavelength may be UV. The first light source may be turned off when operating the second light source. Determining that a particle has reached the target positional area may be based on when the detected scattered light level passes a peak intensity.

The method may comprise using a background level compensation circuit for reducing the response time for the optical detector to adapt to changes in background scattering when operating the second light source. The compensation circuit may for example be used to inject a signal to an amplifier of the optical detector which emulates a background signal, such as to reduce the change in background signal seen by the amplifier.

The invention may be implemented at least in part by software.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an optical particle sensor which uses light sources of different first and second wavelengths. A first light source is used to detect light scattering and also to determine when a particle reaches a target positional area. In response to the particle being determined to reach the target positional area, a second light source is operated to provide a pulse of light, and light emitted from the particle in response to the pulse of light is detected.

Figure 2:
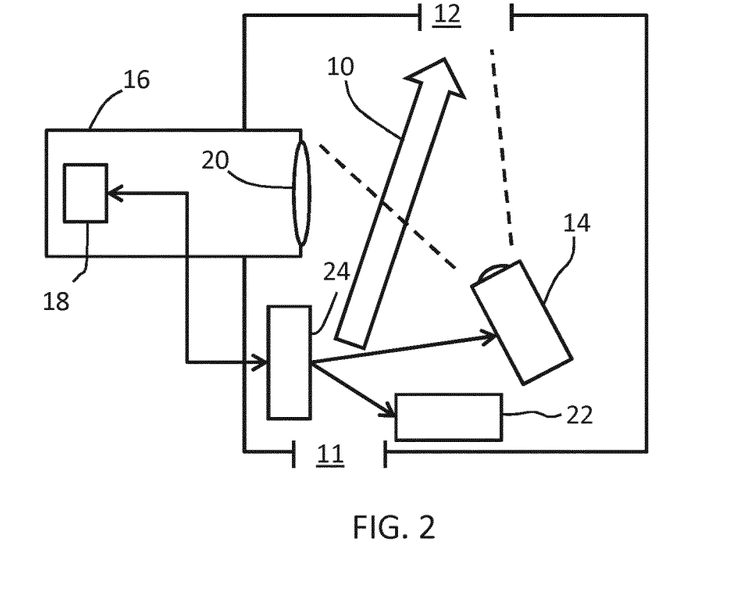
FIG. 2 shows a generic design of an optical particle sensor.

FIG. 2 shows an example of an optical sensor of the general type to which the invention may be applied.

There is a gas flow 10 from an inlet 11 to an outlet 12 of the overall sensor device. A light source arrangement 14, in particular an LED arrangement, for producing multiple wavelengths is used to illuminate the gas flow to enable optical detection of entrained particles based on optical measurements of scattering and/or fluorescence. The LED arrangement is to one side of the detection volume and the sensing is carried out at the opposite side. An alternative design may make use of reflection of light.

Thus, light may be detected which is emitted by the particles (in response to UV light stimulation) or light may be detected which is reflected or scattered by the particles. In the latter case, the light is the same wavelength which was output by the light source.

An optical sensor 16 comprises a phototransistor sensor 18 and optionally a focusing lens 20 at which scattered light (or fluorescence light) is collected.

A heater 22 is used for inducing convective flow through the sensor device. By the resulting buoyancy, the air flows towards the top of the detector, carrying the particles through the detection volume.

A controller 24 controls the processing of the sensor signals and operation of the heater and light source.

The sensor may further comprise a detector for detecting when a particle enters the gas flow 10, to then control the timing of operation of the LED arrangement.

The first light source is initially continuously on. The first light source is for example an efficient high power red or near infrared LED. As soon as a particle is detected (because the scattering increases), the first light source is briefly switched off and replaced with a second light source which is switched on, in order to determine the scattering or fluorescence separate to the scattering in the red or near infrared wavelength.

The light source arrangement may comprise only LEDs or there may be a combination of LEDs and laser diodes or indeed lasers. There are preferably three light sources, but the invention may be applied to a system with two light sources or indeed more than three light sources. More light sources enable more accurate discrimination between particle types, because a greater number of particle characteristics (i.e. fluorescence or scattering properties at a greater number of wavelengths) are obtained.

The use of fluorescent detection in combination with near infrared detection for example enables discrimination between organic fluorescent particles and inorganic non-fluorescent particles. Both will scatter the red or near infrared light, but only the biological fluorescent particles will give a fluorescent signal.

The detection volume is part of a housing which is placed on a printed circuit board with the electronics to convert the signal due to the particles into a count as well as to provide a degree of particle identification. The internal shape of the housing is such that leakage of light directly towards the phototransistor sensor, which would give a background signal, is kept to minimum. Furthermore, a phototransistor has a leakage current that will show up as a background even in the total absence of light. By electronically filtering out any remaining DC signal, the pulsed particle signal remains.

Figure 3:
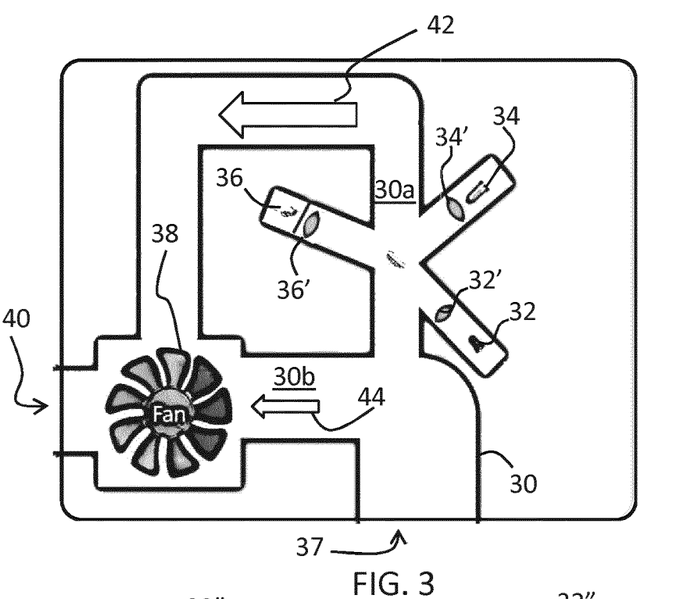
FIG. 3 shows an optical particle sensor in accordance with the invention.

FIG. 3 shows an example of the system of the invention in more detail.

The system comprises a fluid channel 30 which splits into a first branch 30a and a second branch 30b. The first branch 30a is for the detection of particles, and it includes a red or near infrared LED 32, a UV LED 34 and a shared detector 36, which has greatest sensitivity to the red or near infrared output of the LED 32.

In order to prevent disturbance by ultra-fine particles these are removed from the air stream. This is performed by an abrupt change of flow direction where the two branches are formed. The larger particles will move on along the first branch 30a while the small particles will follow the curve around to the second branch 30b. The precise shape depends on the cut-off size that is desired.

A fan 38 draws air in from an inlet 37, through the two branches 30a, 30b and out of an exhaust 40. The flow 42 in the branch 30a carries the larger particles, and the flow 44 in the branch 30b carries the smaller particles.

The near infrared LED is used to determine the position of a particle and the reflectivity in the near infrared wavelength range. The optional lenses 32', 34' and 36' are also shown to enhance the desired optical effects. The signal to noise ratio may be further improved by placing optical filters in front of the detector 36. The UV LED 34 is used to estimate the fluorescence of the particle.

Figure 4:
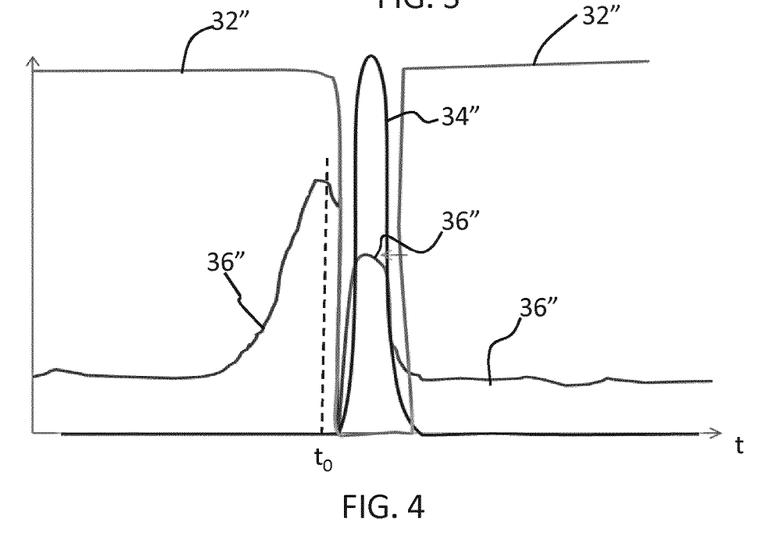
FIG. 4 shows the drive signals for the two LEDs and the detector signal for the sensor of FIG. 3.

FIG. 4 shows the drive voltage for the near infrared LED 32 as 32", the detected signal as 36" and the UV LED drive signal as 34". The UV LED drive signal comprises a pulse, for example with a width in the range 0.05-0.1 seconds. The amplitude of the peak is at least 2 times the maximum permitted continuous drive signal, for example in the range 5 to 100 times. The duty cycle of the second LED drive signal depends both on the width of the pulse compared to the total time it takes a particle to travel through the sensor chamber, and also the rate at which particles enter the chamber. Thus, the duty cycle will typically be much lower than 1/n where n is the factor by which an overdrive signal is used.

When a particle enters the optical chamber along the branch 30a, near infrared light will be scattered. When moving towards the center of the chamber the scattered intensity will increase. Once the particle starts to move away from the center the scattered light intensity will drop again. Thus, particle detection at the center, which may be considered to be a target region, can be identified at time to.

At this time the UV LED 34 is controlled to emit the high intensity light pulse 34" which can be detected by the detector 32 even though it is offset from the optimum sensitivity, because the intensity is raised above the maximum steady state light output intensity.

The system has only one detector so the near infrared LED 32 is switched off when the UV LED is operated. The near infrared reflection and the UV fluorescence may be processed to indicate what type of particle is present. With multiple detectors and more LEDs at other wavelengths more detailed information may also become available.

For interpretation of the measured parameters a self-learning algorithm such as a neural network can be employed.

The different LEDs 32, 34 (or other light sources) will have different levels of background scattering. This will give rise to large disturbances in the detector-amplifier chain since the detector and electronics cannot respond quickly enough to the new level of background scattering.

Figure 5:
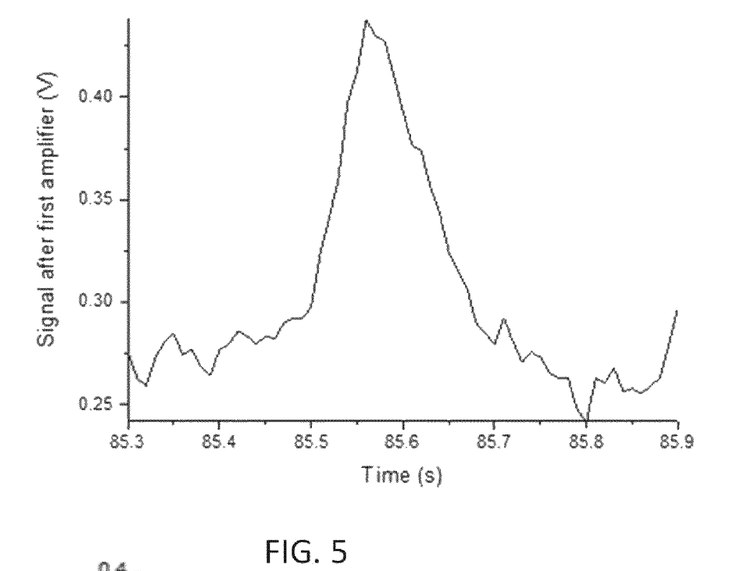
FIG. 5 shows the signal captured from a particle as it passes along the detection channel.

FIG. 5 shows the scattered signal of a single smoke particle passing by as seen by a single LED when the particle passes through the detection volume. There is a detection peak with a duration of around 0.2 s. If this particle needs to be seen by a second LED, that has to be performed within 0.1 s.

However, when the first LED is switched off and the second LED is switched on, the background scattering changes. Because of the slow response of the detector and the filtering in the detector circuit, it typically takes almost 4 seconds before such a circuit is able to detect particles again.

Figure 6:
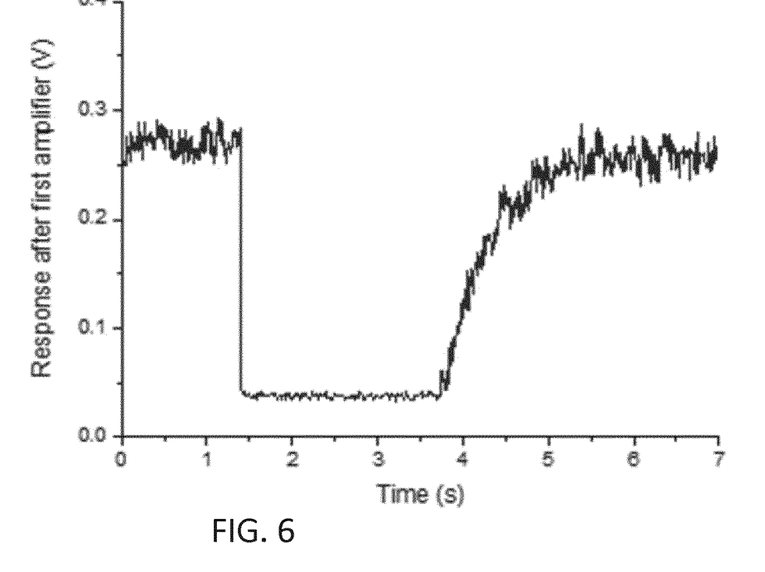
FIG. 6 shows the amplified signal when there is a change in the light source for a conventional amplifier.

FIG. 6 shows the response from the amplifier after turning off the first LED and turning on the second LED. There is a drop in the background scattering level so the amplified signal drops while the amplifier adjusts its settings. By the time the detection circuit is ready to receive scattered signals from the second LED, the particle has passed and cannot be measured.

Optimizing the detector chain can limit the disturbance time to about 1.5 seconds, but that remains far too long.

In order to prevent disturbance by the change in background signal level, the background level change as seen by the amplifier may be electronically compensated.

For this purpose, a background level compensation circuit may be provided for reducing the response time for the optical detector to adapt to changes in background scattering when operating the second light source. This applies whether or not the first light source is turned off. There will be a change in background signal either when adding the second light source output, or when switching from the output of the first light source to the output of the second light source.

The optical detector for example comprises an optical sensor and an amplifier for amplifying the optical sensor signal. The compensation circuit may then be designed for injecting a signal to the amplifier which emulates a background signal, such as to reduce the change in background signal seen by the amplifier.

Figure 7:
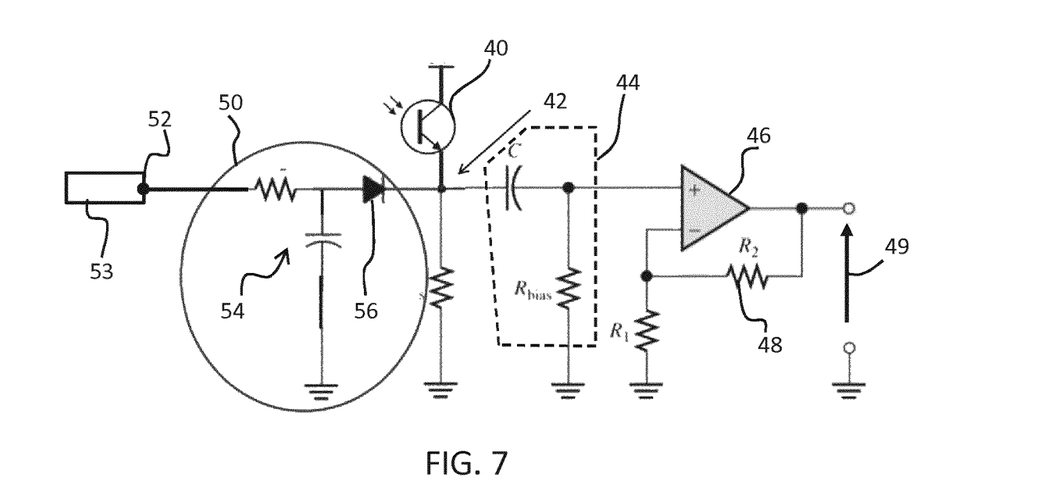
FIG. 7 shows an amplifier circuit for use in the sensor of FIG. 2.

FIG. 7 shows an example of an optical detector which makes use of an amplifier, and including one example of a compensation circuit as explained briefly above.

The optical detector is shown as a single phototransistor, although other optical detectors and optical detector circuits may be used. The light level controls the current delivered to a node 42 and hence the voltage at the node. The node 42 is the input of a high pass RC filter 44. The charging of the capacitor of the high pass filter 44 implements a DC offset cancellation function. The high pass filtered signal is provided to the non-inverting input of an amplifier 46, with a gain set by the negative feedback path 48. The output of the amplifier is shown as reference 49.

There are other circuits instead of a high pass filter that can be used for offset cancellation, such as an operational amplifier circuit to implement a subtraction. Many other signal cancellation circuits are possible. The offset cancellation may be performed inside the amplifier itself.

In the example shown above, the background level of the second LED is lower than of the first LED. Thus, the capacitor of the high pass filter needs to discharge before a signal can be measured, and the phototransistor is also inherently slow. This slow response also automatically filters high frequency noise. A photodiode will have a faster response but reduced sensitivity.

The circuit of FIG. 7 has a current injection circuit 50 to which an injection voltage 52 is provided from a voltage source 53 (which may be part of the controller 24). The current injection circuit functions as a background level compensation circuit. There is an RC low pass filter 54, which charges an output node to the voltage at the terminal 52. The voltage is used to create an injection current through diode 56. The diode current is provided to the node 42 so that it is seen by the rest of the circuit as equivalent to current generated by the detector 40.

This delay matching may for example instead be implemented by using a programmable voltage generator so that the original voltage waveform provides the desired matching to the response of the detector circuit.

In the example shown, when switching from the first to the second LED, additional current is required to represent the background illumination level that was present while the first LED was illuminated.

The current injection circuit 50 comprises a time delay circuit in this example in the form of an RC network. This is so that the change in the compensation current matches the response time of the phototransistor.

Figure 8:
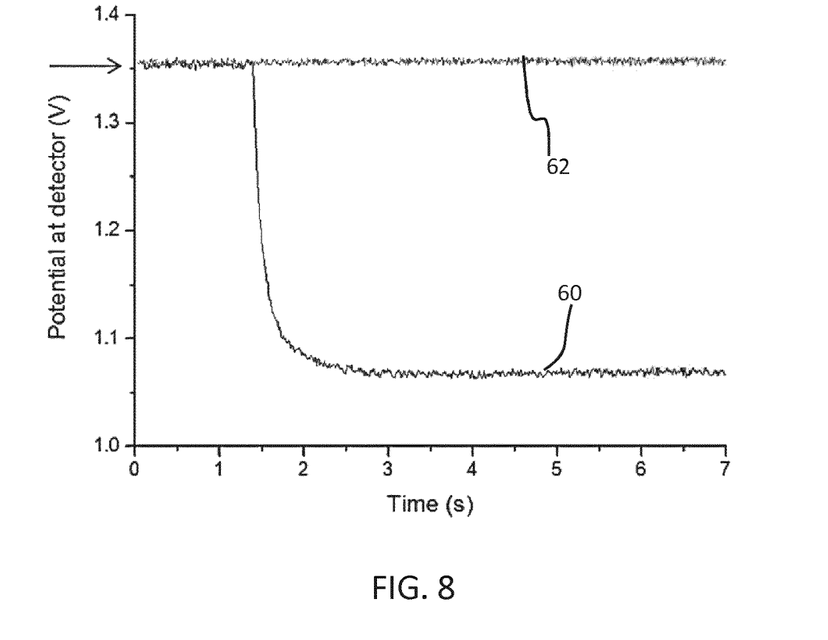
FIG. 8 shows the signal at the detector when there is a change in the light source and using the amplifier circuit of FIG. 4 compared to the signal with a conventional amplifier.

FIG. 8 shows as plot 60 the background level 60 as picked up at the node 42 at the output of the detector 40, when switching from one LED to the other at approximately 1.4 s. After about 1 second the new background level is measured.

Plot 62 shows the background level remaining constant as a result of the current injection provided by the compensation circuit 50. By adding additional current with the right delay (to match the decrease in signal of slope 60) a virtually stable background can be observed as plot 62.

Figure 9:
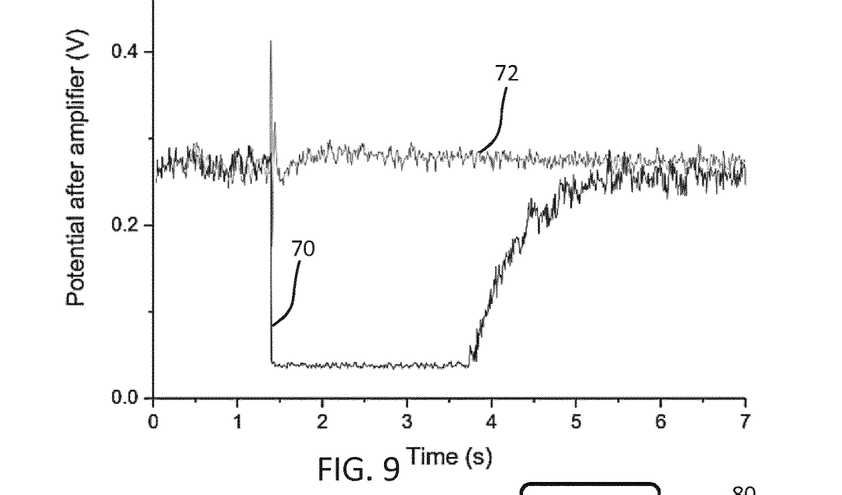
FIG. 9 shows the amplified signal when there is a change in the light source using the amplifier circuit of FIG. 7 compared to the signal with a conventional amplifier.

FIG. 9 shows the corresponding signal 49 at the output of the amplifier. Plot 70 shows the same plot as in FIG. 6. Plot 72 shows the improvement provided by the background compensation system explained above. Apart from a short (<50 ms) glitch, the simple RC current addition circuit results in a detector circuit that remains sensitive over time.

The circuit functions in an analogous way when second LED happens to have a higher background signal level.

With a more advanced signal processing circuit, the glitch can be made even smaller and shorter.

The precise level of current injection needed, and hence the compensation voltage required, can be determined in the absence of particles (since it relates to background signal levels) and can be carried out automatically as part of a (regular) system calibration.

As explained above, the UV LED is operated above its nominal maximum current. This nominal maximum current may be defined as the "continuous current damage threshold". This is a parameter supplied by manufactures of light sources such as light emitting diodes. The parameter refers to the maximum current that can be supplied to the light source without damaging the light source due to overheating.

The particle sensor of the invention is able to use low cost light sources such as IR or UV light emitting diode as well as a shared low cost detector. By overdriving the UV light source temporarily, the light output is increased, and the signal to noise ratio of the detected signal increases. The result is a particle detector that is lightweight, cheap and accurate. The life-time of the UV light source is also extended by having low duty cycle operation.

The light output of the UV light source is multiplied, for example 10 to 100 times, compared to driving the UV light source at the continuous current damage threshold.

The wavelength range of the UV light source is for example between 200 nm and 400 nm. For example, the first light source is a UVC LED with a wavelength range between 200 to 280 nm or a UVB LED with a wavelength range between 280 to 315 nm, or a UVA LED with a wavelength range between 315 to 400 nm. The infrared light source may have an infrared wavelength range between 760 nm and 2500 nm (i.e. the near infrared range) for example a wavelength range of 940 nm to 950 nm.

The light detection wavelength range of the detector corresponds to the infrared light source output wavelength range.

Figure 10:
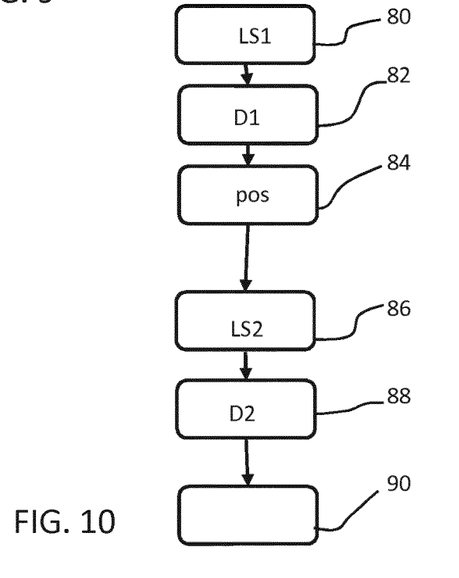
FIG. 10 shows an optical particle sensing method.

FIG. 10 shows an optical particle sensing method.

In step 80, a first (near infrared) light source is operated having a first wavelength output.

In step 82, light scattered from a particle is detected.

In step 84 the detected scattered light is analyzed to determine when the particle reaches a target positional area.

In step 86, in response the particle being determined to reach the target positional area, a second (UV) light source is operated having a second wavelength to provide a pulse of light.

In step 88 light emitted from the particle in response to the pulse of light is detected.

In step 90, the two detector signals are combined to determine a particle type, based on the combined fluorescence or scattering properties at the two different wavelengths. The two detector signals are from the same detector, and it has lower sensitivity to the second wavelength than the first wavelength. The sensitivity to the second wavelength may be less than 50% or less than 25% or even less than 15% of the sensitivity to the first wavelength.

The method may be extended to third or further light sources and detector signals. The detector signals are preferably obtained for a single particle during a single transit through the particle sensor. Thus, the total sensing period for obtaining all of the detector signals is typically less than 0.5 s.

The invention may be used in low-cost consumer air purifiers and related products.

As discussed above, embodiments make use of a controller 24 to implement the processing of the sensor information and control of the compensation circuit. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An optical particle sensor, comprising:
    an optical arrangement comprising at least first and second light sources of different first and second wavelengths;
    an optical detector for detecting light emitted from particles to be sensed or light from the light sources scattered by particles to be sensed; and
    a controller for controlling the operation of the first and second light sources,
    wherein the controller is adapted to:
        operate the first light source, and detect light scattering using the optical detector;
        determine when a particle reaches a target positional area based on an analysis of the detected scattered light by the controller;
        in response the particle being determined to reach the target positional area, operate the second light source with a drive signal which is at least 2 times the maximum permitted continuous drive signal to provide a pulse of light with a duty cycle of less than 20%; and
        detect light emitted from the particle in response to the pulse of light using the same optical detector.

2. The optical particle sensor as claimed in claim 1,
    wherein the optical detector comprises a single optical sensor for detecting the first and second wavelengths; and
    wherein the optical sensor has greater sensitivity to the first wavelength than to the second wavelength.

3. The optical particle sensor as claimed in claim 2, further comprising a background level compensation circuit for reducing the response time for the optical detector to adapt to changes in background scattering when the controller is operating the second light source.

4. The optical particle sensor as claimed in claim 3,
    wherein the optical detector includes an optical sensor and an amplifier for amplifying a signal of the optical sensor; and
    the compensation circuit is for injecting a signal to the amplifier which emulates a background signal.

5. The optical particle sensor as claimed in claim 1,
    wherein the first light source comprises a red or infrared, LED and the second light source comprises a UV LED; and
    wherein the controller is further adapted to turn off the first light source when operating the second light source.

6. The optical particle sensor as claimed in claim 1, wherein the controller is further adapted to determine that a particle has reached the target positional area when the detected scattered light level passes a peak intensity.

7. The optical particle sensor as claimed in claim 1, wherein the optical arrangement further comprises a visible light source.

8. The optical particle sensor as claimed in claim 1, wherein the controller is further adapted to provide an identification of a type of particle based on an analysis of the detected scattered light and the detected emitted light by the controller.

9. An optical particle sensing method, comprising:
    operating a first light source having a first wavelength output;
    detecting light scattered from a particle using an optical detector;
    analyzing the detected scattered light to determine when the particle reaches a target positional area;
    in response the particle being determined to reach the target positional area, operating a second light source having a second, different, wavelength to provide a pulse of light, wherein the second light source is operated with a duty cycle of less than 20% and with a drive signal which is at least 2 times the maximum permitted continuous drive signal; and detecting light emitted from the particle in response to the pulse of light using the same optical detector.

10. The optical particle sensing method as claimed in claim 9, further comprising using a background level compensation circuit for reducing the response time for the optical detector to adapt to changes in background scattering when operating the second light source.

11. The optical particle sensing method as claimed in claim 10,
wherein the background level compensation circuit includes an amplifier; and
wherein the using the background level compensation circuit include injecting a signal to the amplifier of the optical detector which emulates a background signal.

12. The optical particle sensing method as claimed in claim 9,
wherein the first wavelength is red or infrared, and the second wavelength is UV; and
wherein the optical particle sensing method further comprises turning off the first light source when operating the second light source.

13. The optical particle sensing method as claimed in claim 9, further comprising determining that a particle has reached the target positional area when the detected scattered light level passes a peak intensity.

14. The optical particle sensing method as claimed in claim 9, further comprising providing an identification of a type of particle based on analysis of the detected scattered light and the detected emitted light.

15. The computer program comprising computer code means which is adapted, when run on a computer, to implement the method of claim 9.

16. An optical particle sensor, comprising:
an optical arrangement comprising at least first and second light sources of different first and second wavelengths;
an optical detector for detecting light emitted from particles to be sensed or light from the light sources scattered by particles to be sensed;
a controller for controlling the operation of the first and second light sources,
wherein the controller is adapted to:
operate the first light source, and detect light scattering using the optical detector;
determine when a particle reaches a target positional area based on analyzing the detected scattered light;
in response the particle being determined to reach the target positional area, operate the second light source; and
detect light emitted from the particle in response to the pulse of light using the same optical detector; and
a background level compensation circuit for reducing the response time for the optical detector to adapt to changes in background scattering when the controller is operating the second light source.

17. The optical particle sensor as claimed in claim 16,
wherein the optical detector includes an optical sensor and an amplifier for amplifying the optical sensor signal, and
wherein the background level compensation circuit is for injecting a signal to the amplifier which emulates a background signal.

18. The optical particle sensor as claimed in claim 16, wherein the controller is further adapted to determine that a particle has reached the target positional area when the detected scattered light level passes a peak intensity.

* * * * *